United States Patent [19]
Elias

[11] 4,280,653
[45] Jul. 28, 1981

[54] COMPOSITE CONTAINER INCLUDING A PEELABLE MEMBRANE CLOSURE MEMBER, AND METHOD

[75] Inventor: Thomas C. Elias, Ballwin, Mo.
[73] Assignee: Boise Cascade Corporation, Boise, Id.
[21] Appl. No.: 80,557
[22] Filed: Oct. 1, 1979
[51] Int. Cl.³ .............................................. B65D 5/64
[52] U.S. Cl. ...................... 229/43; 229/5.5; 229/48 T; 220/359; 215/233
[58] Field of Search ............ 229/43, 5.5, 5.6, 5.7; 215/233, 347; 220/359

[56] References Cited

U.S. PATENT DOCUMENTS

| | | | |
|---|---|---|---|
| 2,620,939 | 12/1952 | Weisgerber | 215/347 |
| 2,833,683 | 5/1958 | Quandt | 229/43 |
| 3,317,068 | 5/1967 | Betner | 215/233 |
| 3,391,847 | 7/1968 | Christin et al. | 229/43 |
| 3,655,503 | 4/1972 | Stanley et al. | 229/48 T X |
| 3,674,134 | 7/1972 | Turner | 229/48 T X |
| 3,817,417 | 6/1974 | Edwards | 229/43 X |
| 3,892,351 | 7/1975 | Johnson et al. | 229/43 |
| 3,940,496 | 2/1976 | Turpin et al. | 426/123 |
| 3,946,871 | 3/1976 | Sturm | 229/43 X |
| 3,949,927 | 4/1976 | Smith et al. | 229/5.5 |
| 3,973,719 | 8/1976 | Johnson et al. | 229/5.6 |
| 4,013,188 | 3/1977 | Ray | 229/43 |
| 4,171,084 | 10/1979 | Smith | 229/5.5 |
| 4,196,841 | 4/1980 | Smith et al. | 229/5.5 |
| 4,209,126 | 6/1980 | Elias | 229/43 |

Primary Examiner—Davis T. Moorhead
Attorney, Agent, or Firm—Laubscher & Laubscher

[57] ABSTRACT

A composite container including a peelable patch top closure assembly, and a method for forming the same, are disclosed, including a tubular composite body member reversely outwardly curled at one end, a generally disk-shaped membrane patch top member extending across the reversely curled body end to close the same, and a heat sealable coextrudable synthetic plastic film laminate bonding the patch top member to the reversely curled body end, the coefficient of adhesion between the laminate layers being less than that between the laminate layers and the adjacent surfaces of the associated members, respectively.

6 Claims, 8 Drawing Figures

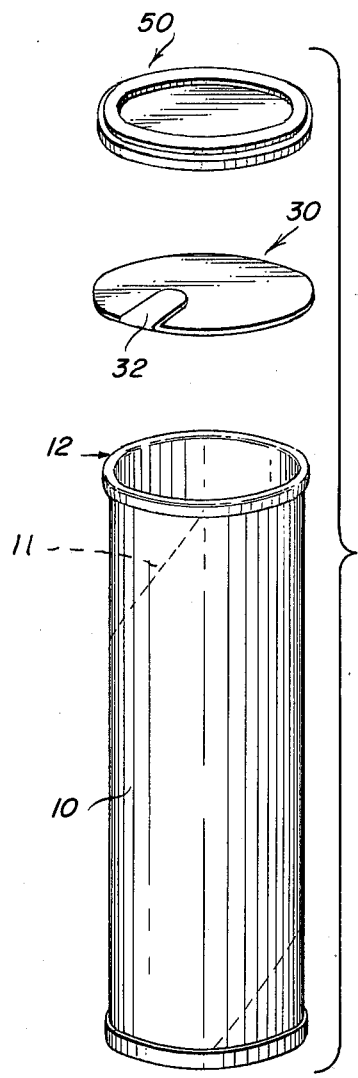
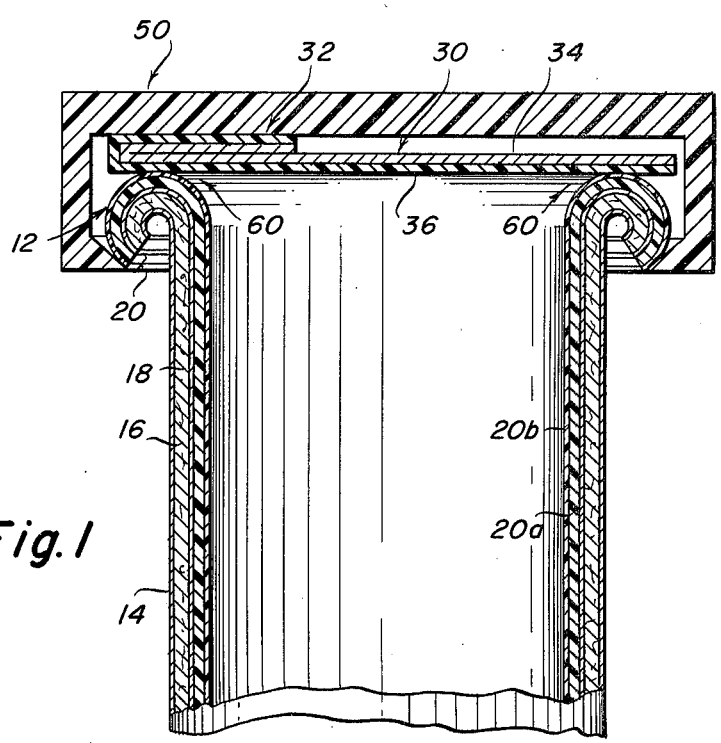
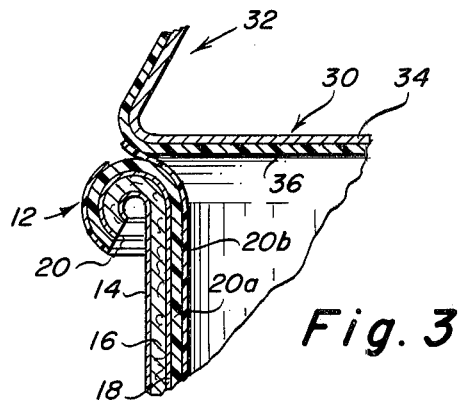
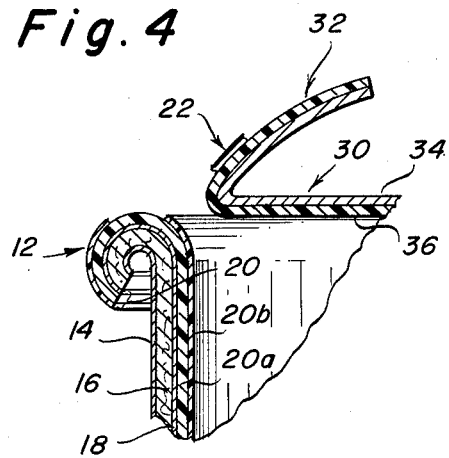
Fig. 1
Fig. 2
Fig. 3
Fig. 4

COMPOSITE CONTAINER INCLUDING A PEELABLE MEMBRANE CLOSURE MEMBER, AND METHOD

BRIEF DESCRIPTION OF THE PRIOR ART

The present invention relates generally to a composite container having a peelable membrane type patch top member heat sealed to one end of the container by a synthetic plastic coextruded film laminate including at least two layers, the degree of adhesion between the laminate layers being less than that between the laminate layers and the adjacent surfaces of the associated members, respectively, and to the method for forming said container.

Containers having a peelable heat sealed closure member are known in the art as evidenced by the patents to Johnson et al U.S. Pat. Nos. 3,892,351 and 3,973,719, Turpin et al U.S. Pat. No. 3,940,496 and Sturm U.S. Pat. No. 3,946,871. The use of a heat sealable coextruded film laminate for closing a package is also known, as evidenced by the patent to Stanley et al U.S. Pat. No. 3,655,503. Owing to the selection and arrangement of the laminate layers, opening of the package and delamination of the heat sealed laminate layers occurs in an unpredictable manner. The present invention was developed to avoid the above and other drawbacks of the known containers including heat sealed closure members.

SUMMARY OF THE INVENTION

Accordingly, the present invention relates to a composite container including a peelable patch top closure assembly having predictable opening characteristics. The composite container includes a generally tubular composite body member having a reversely outwardly curled body end, a generally disk-shaped membrane-type patch top closure member extending across said reversely curled body end, and a heat sealable coextruded film laminate bonding said patch top member in sealed closed relation with said reversely curled body end. The coextruded film laminate includes at least two laminate layers which are bonded to each other by a bond having a coefficient of adhesion which is less than the coefficients of adhesion between said laminate layers and said patch top member and said reversely curled body end, respectively, whereby upon removal of the patch top member from the container end, the laminate layers tear apart at their interface surface in a predictable manner to effect opening of said body member end.

Accordingly, a primary object of this invention is to provide a peelable patch top closure assembly for a composite container end, wherein a heat sealable coextruded film laminate bonds said patch top member in sealed relation to said container end.

Another object of the invention is to provide an improved method of manufacturing a composite container including a peelable patch top closure member which has predictable opening characteristics.

BRIEF DESCRIPTION OF THE DRAWING

Other objects and advantages of the invention will become apparent from a study of the following specification when viewed in light of the accompanying drawing, in which:

FIG. 1 is an exploded perspective view of the container assembly of the present invention;

FIG. 2 is a detailed cross-sectional view of a first embodiment of the present invention;

FIGS. 3 and 4 are detailed cross-sectional views respectively, of the first embodiment illustrating the patch top being progressively peeled away;

DETAILED DESCRIPTION OF THE INVENTION

Figure 5:
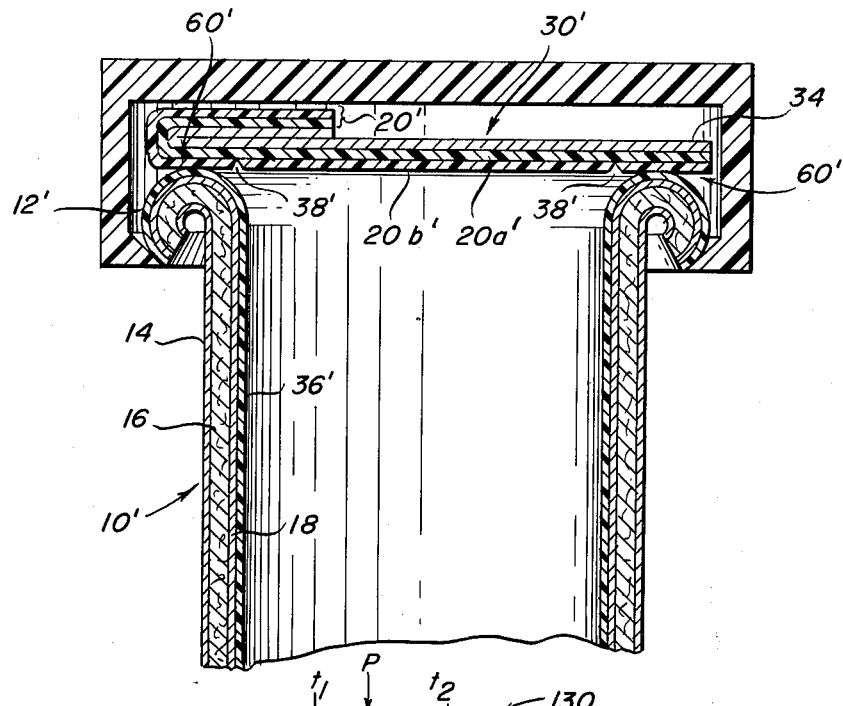
FIG. 5 is a detailed cross-sectional view of a second embodiment of the present invention.

Referring first to FIG. 1 the composite container of the present invention includes a generally tubular helically wound composite body member 10 including a helical butt joint 11, a reversely outwardly curled upper end 12, a disk-shaped membrane patch top member 30 for closing the reversely curled end of said container and including a pull tab 32, and a synthetic plastic overcap 50 mounted on the container in protective relation with the patch top member 30.

As shown in FIG. 2, the body member 10 includes an outer label layer 14 (formed of paper or metal foil), a fibrous body layer 16, an inner liner layer 18 (preferably formed of aluminum foil), and a cast or blown coextruded film laminate 20 including first and second synthetic plastic layers 20a and 20b, respectively. The first layer 20a is preferably thicker than the second layer 20b and is made from a polymer noted for its toughness and abrasion resistance, such as polypropylene (PP). Moreover, the first layer 20a has a higher softening temperature than layer 20b. The second layer 20b is preferably formed of a resin blend which makes fusion seals to a variety of resin types under a range of time, temperature, and pressure conditions. It has been found that a resin blend (physical mixture) of polyethylene (PE) and ethyl methyl acrylate (i.e., Gulf's Poly Eth #2255) (EMA) is particularly suited for this purpose. With little or no EMA in the blend, intraply adhesion between layers 20a and 20b will invariably be weak (typically ½ lb. peel strength per square inch). With 50% or more EMA in the blend, intraply adhesion increases and approaches the film tearing strength. By selecting the proper EMA:PE ratio in the blend, the ply adhesion for the intended end use can be achieved. In accordance with the present invention, the blend is about 70% EMA to about 30% polyethylene, thereby to achieve an adhesion strength of at least 3 pounds per square inch.

The membrane type patch top member 30 includes a flexible layer 34 (formed from a material such as metal foil, heat resistant synthetic plastic or paper), and a surface coating layer 36 selected from a variety of resins, such as PE, surlyn (DuPont ionomer), EMA, ethylene vinyl acetate, or blends thereof.

The can body 10 is formed by helically winding the inner liner and fibrous body wall layers on a mandrel. Coextruded film laminate layer 20 is first wound on the mandrel followed by liner layer 18, fibrous body wall layer 16, and label layer 14, respectively. The helically wound body member is then cut to the proper length, whereupon one end is reversely outwardly curled to cause the coextruded film laminate layer 20 to extend around the uppermost extremity of the reversely curled body end 12. The patch top member 30 is then placed on the reversely curled end and heat sealed thereto, whereupon the protective synthetic plastic overcap 50 is mounted over the patch top member 30 in protective relation thereto.

OPERATION

Upon removal of the protective overcap member 50, opening of the container one end is effected by pulling the patch top tab 32, whereby, owing to the strong intraply adhesion between layers 20b and 36, and the weaker intraply adhesion between layers 20a and 20b, pulling of the tab 32 causes coextruded film laminate layer 20b to initially tear through itself and to be progressively peeled from layer 20a at the outer periphery of the fusion seal 60, as shown in FIG. 3. Upon further pulling of tab 32, layer 30b tears through itself again, whereby a section 22 of the layer 20b separates from layer 20b and remains fusion bonded to layer 36 of the patch top member, as shown in FIG. 4. The tab is then progressively pulled to effect complete removal of the patch top 30 from the body member 10, causing a circular section 22 of layer 20b to remain attached to the patch top 30.

In the second embodiment of FIG. 5, the coextruded film laminate 20' is bonded to the inner surface of the patch top member 30', whereby less of the specialized coextruded film laminate material is required. The film laminate 20' includes a layer 20a' of polypropylene, and a layer 20b' formed from a blend of PE and EMA as discussed above. The body member 10' is coated with a layer 36' formed from resins which adhere to the EMA:PE blend, such as a coextruded film of PP-EMA-PE, high density PE-PE, PP (Homopolymer)-PP (Copolymer) or a single layer of PP (Copolymer). The patch top member 30' is heat sealed to the reversely curled body one end 12' to form a circumferential fusion seal 60'. In this embodiment a circular score line 38' or other line of weakness may be provided in the coextruded film laminate 20 to allow layer 20b' to more easily tear through itself, thereby to prevent an undesirable thin film of layer 20b from remaining across the container one end upon removal of the patch top member 30'.

Figure 6:
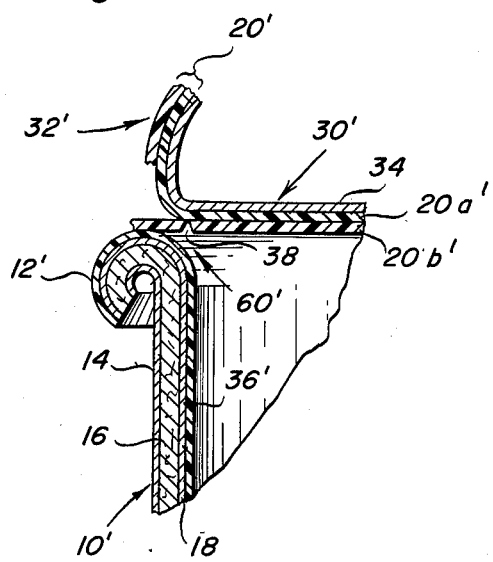
FIGS. 6 and 7 are detailed cross-sectional views respectively, of the second embodiment illustrating the patch top being progressively peeled away.
Figure 7:
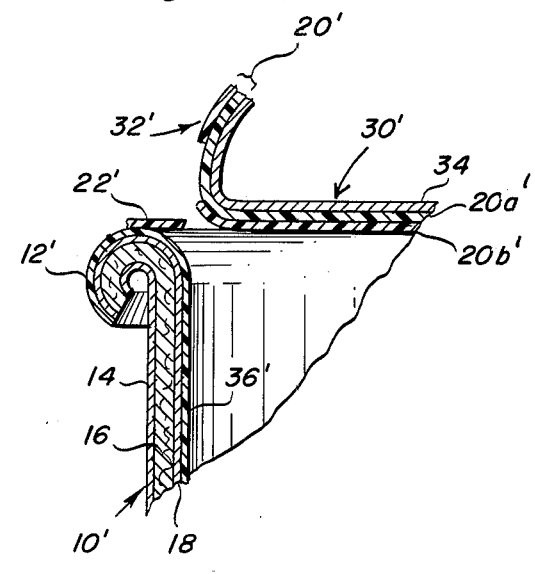

Removal of the patch top member 30' is effected by pulling tab 32', thereby causing layer 20b to tear through itself and separate from layer 20a at the outer periphery of the fusion bond 60', as shown in FIG. 6. Upon further pulling of the tab 32', the layer 20b' tears through itself again at the score line 38', whereby a section 22' of layer 20b' is separated from layer 20b' and remains bonded to the reversely curled body one end 12'. The tab 32' is then progressively pulled to effect complete removal of the patch top 30' from the body member 10', thereby causing a circular section 22' to remain attached to the reversely curled end 12'.

Figure 8:
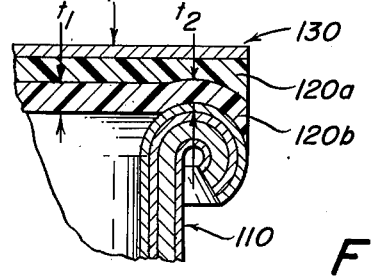
FIG. 8 is a detailed cross-sectional view illustrating the results produced by the final pressing assembly step.

As shown in FIG. 8, as a final step, the patch top closure member 130 may be pressed downwardly, with the application of heat, upon the body member 110, thereby to effect a thinning or reduction in thickness of the layer 120b from thickness $t_1$ to the reduced thickness $t_2'$. Consequently, during opening of the container, the patch top closure member 130 may be peeled from the composite container body 110 in a positive manner.

While in accordance with the provisions of the Patent Statutes, the preferred forms and embodiments have been illustrated and described, it will be apparent that changes and modifications may be made without deviating from the inventive concepts set forth above.

What is claimed is:

1. A composite container including peelable membrane closure means, comprising
    (a) a vertically arranged tubular composite body member including
        (1) a fibrous body wall layer; and
        (2) an inner liner layer completely lining the inner surface of said body wall layer;
        (3) the upper end of said body member being reversely outwardly curled, whereby the inner liner layer extends around the upper extremity of said reversely curled upper body end;
    (b) a horizontal generally circular membrane patch top member extending across said reversely curled upper body end; and
    (c) means including a coextruded film laminate bonding said patch top member with said reversely curled upper body end, said coextruded film laminate including
        (1) a first layer bonded to said inner liner layer at at least the reversely curled upper end of said body member; and
        (2) a second layer bonded to at least that portion of the lower surface of said patch top member that is opposite said reversely curled body end portion;
        (3) said first and second layers being bonded to each other with a bond having a coefficient of adhesion that is greater than 3 pounds/square inch but less than the coefficients of adhesion between said layers and said patch top and body members, respectively, whereby upon progressive separation of one edge portion of said patch top member from said reversely curled body one end, one portion of one of said laminate layers is initially torn through itself and the remaining portion of the said one laminate layer is subsequently progressively peeled from the interface surface of the other laminate layer.

2. A composite container as defined in claim 1, wherein one of said first and second layers comprises polypropylene.

3. A composite container as defined in claim 2, wherein the other of said first and second layers comprises a blend of polyethylene and ethylene methyl acrylate, whereby the degree of adhesion between the layers may be controlled by varying the ratio of the ethylene methyl acrylate to the polyethylene.

4. A composite container as defined in claim 3, wherein said blend comprises between 0–30%, by weight, of ethylene methyl acrylate, the remaining portion of said blend comprising medium density polyethylene.

5. A composite container as defined in claim 3, wherein said inner liner layer and said patch top member include layers of metal foil, and further wherein the surface of at least one of said foil layers adjacent the coextruded film layer is coated with a thermoplastic material selected from the group consisting of polyethylene, surlyn, ethylene methyl acrylate, and ethylene vinyl acetate.

6. A composite container as defined in claim 1, wherein at least one layer of said coextruded film laminate includes a circular line of weakness the diameter of which is less than the diameter of the uppermost extremity of said reversely curled body member, and further wherein said patch top member includes a pull tab portion, whereby peeling of said patch top member from said body one end is facilitated.

* * * * *